United States Patent [19]

Graham

[11] Patent Number: 4,477,734

[45] Date of Patent: Oct. 16, 1984

[54] CONTROL SYSTEM FOR EDDY CURRENT COUPLING DRIVE FOR ARMOURED FACE CONVEYORS

[75] Inventor: Robert S. Graham, Wishaw, United Kingdom

[73] Assignee: Anderson Strathclyde PLC, Glasgow, Scotland

[21] Appl. No.: 495,348

[22] PCT Filed: Aug. 31, 1982

[86] PCT No.: PCT/GB82/00260

§ 371 Date: May 12, 1983

§ 102(e) Date: May 12, 1983

[87] PCT Pub. No.: WO83/01131

PCT Pub. Date: Mar. 31, 1983

[30] Foreign Application Priority Data

Sep. 17, 1981 [GB] United Kingdom ............... 8128132

[51] Int. Cl.³ .......................................... H01H 35/06
[52] U.S. Cl. ............................. 307/120; 307/132 EA;
361/43; 361/166; 361/170; 361/195; 318/779;
318/799; 198/855
[58] Field of Search ............ 307/120, 132 E, 132 EA,
307/140; 361/42, 43, 160, 166, 170, 195;
318/779, 799; 198/855

[56] References Cited

U.S. PATENT DOCUMENTS

| 3,017,527 | 1/1962 | La Vallee | 310/94 |
| 3,076,906 | 2/1963 | Simo | 310/94 |
| 3,586,868 | 6/1971 | Martens et al. | 361/166 X |
| 4,150,303 | 4/1979 | Armstrong | 307/140 |
| 4,187,525 | 2/1980 | Nagura et al. | 361/42 |
| 4,354,747 | 10/1982 | Borowski et al. | 307/132 E X |
| 4,374,353 | 2/1983 | Hasisohn | 318/799 |

OTHER PUBLICATIONS

Method of Torque Reg. and Load Sharing In a Large Overload Conveyor by A. Ray, IEEE 12th Annal Meeting, Oct. 2-6, 1977.

Primary Examiner—A. D. Pellinen
Assistant Examiner—Derek S. Jennings
Attorney, Agent, or Firm—Mason, Fenwick & Lawrence

[57] ABSTRACT

A control system for eddy current coupling drive for armoured face conveyors wherein the systems controls a number of eddy current drives via a pair of power supply lines and a single pilot line. A main contactor controlled by a relay is held closed by contact of a pilot relay which is energized only if relay contacts in individual control units for each drive remain closed. These last mentioned contacts open if certain operating conditions are not met.

4 Claims, 2 Drawing Figures

CONTROL SYSTEM FOR EDDY CURRENT COUPLING DRIVE FOR ARMOURED FACE CONVEYORS

BACKGROUND AND OBJECTS OF THE INVENTION

The present invention relates to a control system for an eddy current coupling drive for armoured face conveyors.

It is known to use eddy current coupling drives for conveyors and such couplings provide a controlled build up of torque and/or speed, and enable the load to be shared reasonably equally between drives when more than one drive is used on the conveyor. When applying the eddy current coupling drive to armoured face conveyors, account must be taken of the fact that the weight of excavated material on the conveyor can increase the frictional resistance and inertia such that considerable excess torque may be required to start the conveyor. It may not be possible to control, consistently, the required torque with the available eddy current coupling drive control system and in this situation the motors may stall. The supply voltages to the motors of several coupling drives may not be identical, resulting in varying maximum available torques, and thus making the application of maximum total torque more difficult. In addition, in longwall mining the drives may be at each end of the armoured conveyor, and these can be separated by several hundred metres. Normally, each eddy current coupling is supplied from a separate control unit which incorporates some form of control of a thyristor rectifier which supplies d.c. current to the excitation coils of the coupling. In a multi-motor drive as is used in armoured face conveyors, these control units are interlinked electrically, and may be mounted in a common enclosure with supply cables being connected to each coupling. If it is also desired to monitor speed signals from the coupling drive, this normally requires another cable between the control units and each coupling drive.

Similarly, measurement of the motor terminal voltage as a control parameter requires further cable between the coupling drives and the control unit. This accumulation of cables between the control units and the drives is impractical in the use of an armoured face conveyor.

It is an object of the present invention to obviate or mitigate the limitations of the existing conveyor control system.

SUMMARY OF THE INVENTION

According to the present invention, there is provided a control system for multiple eddy current coupling drives comprising:

an electrical power supply means including first switching means actuable to close, in response to a start signal, a contact in the circuit of a second switching means, and a timing means arranged to complete the circuit of the second switching means for a predetermined period thus enabling power to be supplied to the several coupling drives, and thereby energising a retaining relay in each coupling drive, said retaining relays having contacts being connected in series in a retaining circuit arranged to retain the said second switching means after said predetermined period has elapsed, electronic control means integral with, or in close proximity to, each coupling drive and arranged to automatically initiate an increase of excitation applied to each coupling drive from an initial zero value to a preset maximum value over a preset time when power is applied to each coupling drive, said control means including means for inhibiting the increase in excitation in response to input speed signals, speed sensing means for monitoring the input and output speeds of the coupling drive, said input speed being compared with a predetermined level, said increase in excitation being inhibited when said input speed falls to the predetermined level, and means for de-energising at least one retaining relay in response to timing means initiated by an inhibiting signal such that said at least one relay is de-energised after a preset time unless an output speed signal indicates that the conveyor is beginning to accelerate, thus interrupting said retaining circuit and interrupting power supply to all couplings.

Preferably said first and said second switching means include first and second relays respectively.

Alternatively, said first and said second switching elements may be any suitable devices such as solid state switches.

Preferably also, the control means includes electrical power transforming means for converting the main electrical power supply to the operating supply level of the eddy current coupling devices.

Preferably also, the power transforming means includes fault detecting means, the fault detecting means being connected between the secondary winding of the transformer and earth.

BRIEF DESCRIPTION OF THE FIGURES

An embodiment of the present invention will now be described by way of example with reference to the accompanying drawings, in which.

DETAILED DESCRIPTION OF A PREFERRED EMBODIMENT

Figure 1:
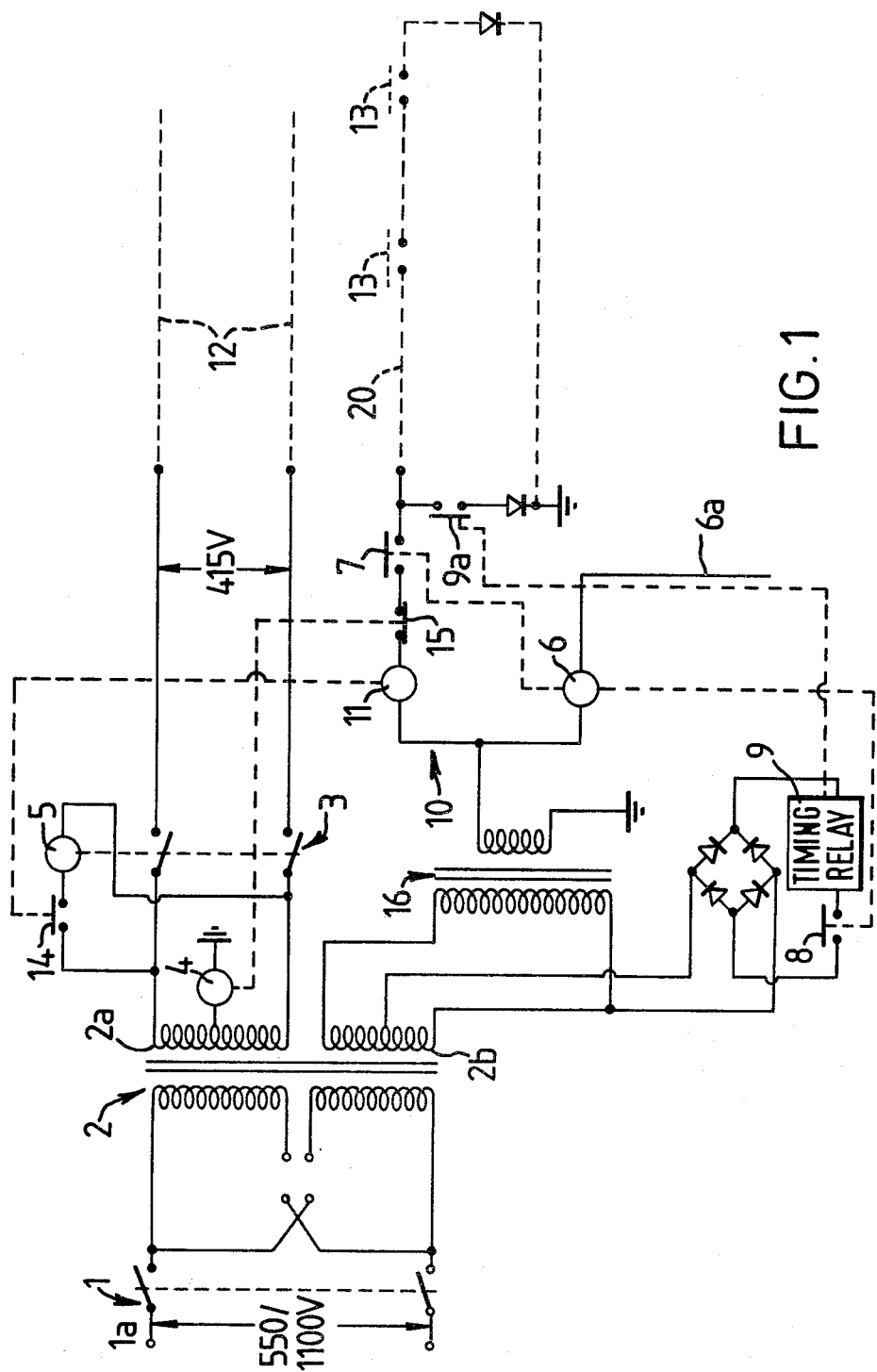
FIG. 1 is a circuit diagram of the control system.

Referring now to FIG. 1, a 550/1100 V main power supply 1a is connected via an isolator switch 1 to a step-down transformer 2. The transformer 2 has two secondary windings 2a and 2b. The ratio of the primary winding to the secondary winding 2a determines the 415 V excitation supply necessary to power the eddy current coupling drives (not shown). A control contractor 3 is connected in the 415 V supply lines 12, and its operating coil 5 is connected across these lines in series with relay contacts 14. An earth leakage relay 4 protects the eddy current coupling drive against earth faults and is connected between the centre tap of the secondary winding 2a and earth. The energising of relay 4 by an earth fault causes normally closed contact 15 to open in a circuit 10 of a pilot relay 11 to open contactor 3 and disconnect supply to the several coupling drives. The control of the contactor 3 is by a control circuit 6a which can be closed by a manual switch or a sequence contact in the motor starter. When this control circuit is closed, control relay 6 is energised closing its contacts 7 and 8, contact 7 closing in the circuit 10 of pilot relay 11 and contact 8 closing to energise a timing relay 9 causing timing relay contacts 9a to close transiently and energise pilot relay 11. Relays 6 and 11 are supplied from an auxiliary transformer 16 which is in turn supplied from secondary 2b on the transformer 2, while the timing relay 9 is supplied from a suitable tapping on the same secondary 2b.

When the pilot relay 11 is energised, contacts 14 close causing the contactor operating coil 5 to be energised thus closing the contactor 3 and applying power to the several coupling drives via supply lines 12. Once power is supplied to the several coupling drives this causes a retaining relay in each coupling to be energised (as will be described), closing relay contacts 13 in each coupling thus completing the retaining circuit of pilot relay 11 by way of a pilot conductor 20 incorporated in the same cable as the power supply, which is looped from the power supply unit through the several coupling drives on the conveyor. When the timing relay 9 times out, timing relay contacts 9a open but power to the several coupling drives is maintained by the retaining circuit of the pilot relay 11.

Figure 2:
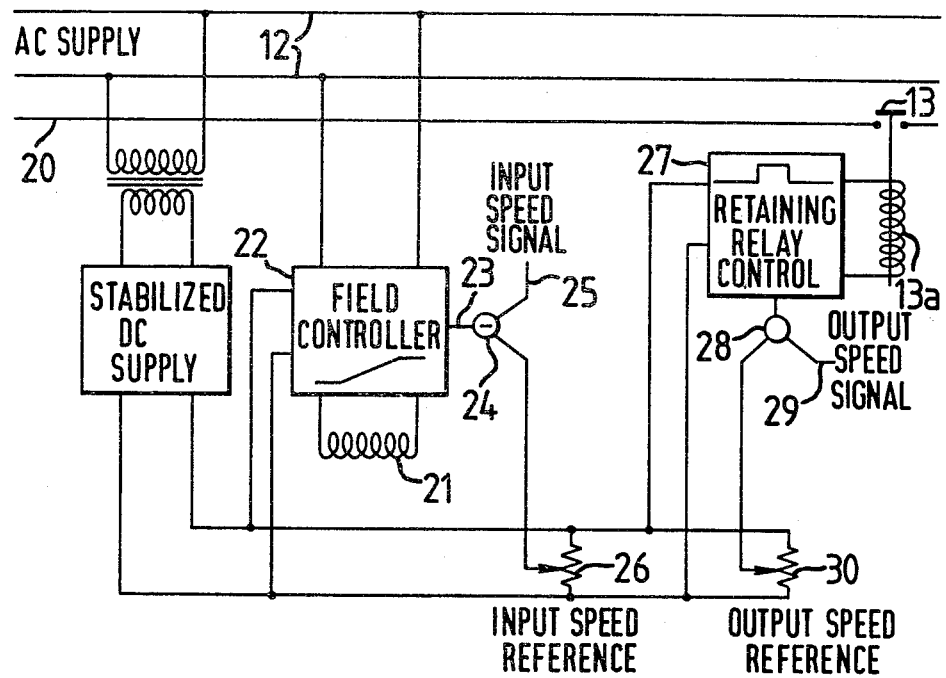
FIG. 2 is a schematic block diagram of the electronic control unit of one eddy current drive in the system.

Referring to FIG. 2, the field coil 21 of the eddy current coupling is controlled by a field controller 22. As is known per se, the field controller 22 supplies an excitation voltage to the field coil 21 which increases linearly over a given time from energisation of the supply lines 12 until full value is reached. Field controller 22 has an inhibit input 23 which is controlled by a comparator 24 which operates to compare an input speed signal on line 25 with an input speed reference signal derived from potentiometer 26. The input speed signal on line 25 represents the input speed of the coupling, that is the speed of the motor driving the coupling, and may be derived by any suitable means such as a tacho-generator. If the input speed drops to be equal to or less than the reference, comparator 24 applies an inhibit signal to input 23 to inhibit any further increase in excitation while this condition lasts, thus preventing stalling of the drive motor.

The retaining relay contact 13 is controlled by circuit 27 which responds to energisation of the supply lines 12 to energise associated relay coil 13a for a given time period. Thereafter, retaining relay control circuit 27 maintains energisation of relay coil 13a in dependence on a comparator 28 which compares an output speed signal on line 29 with an output speed signal derived from potentiometer 30, such that the relay coil 13a is de-energised if the output speed is less than the reference. Thus, if the output does not reach a preset speed within a preset time, contacts 13 open and the whole system is switched off.

Without departing from the scope of the invention it will be understood that the control system can be adapted for use with any other suitable power supply, by altering the transformer ratio.

An important advantage of the present invention is that the available torque from each drive motor is utilised to the maximum independent of the local supply voltage to the motor. In addition, a further advantage is that the entire system requires only a signal a.c. power supply which supplies all the coupling drives via one cable along the length of the working face; the cable carrying the power and control signals, and an earth return.

In addition, the features of the present invention would be incorporated with regard to the safety requirements specified and being of flameproof construction.

I claim:

1. A control system for multiple eddy current coupling drives comprising:

an electrical power supply means including first switching means actuable to close, in response to a start signal, a contact in the circuit of a second switching means, and a timing means arranged to complete the circuit of the second switching means for a predetermined period thus enabling power to be supplied to the several coupling drives, and thereby energising a retaining relay in each coupling drive, said retaining relays having contacts being connected in series in a retaining circuit arranged to retain the said second switching means after said predetermined period has elapsed, electronic control means integral with, or in close proximity to, each coupling drive and arranged to automatically initiate an increase of excitation applied to each coupling drive from an initial zero value to a preset maximum value over a preset time when power is applied to each coupling drive, said control means including means for inhibiting the increase in excitation in response to input speed signals, speed sensing means for monitoring the input and output speeds of the coupling drive, said input speed being compared with a predetermined level, said increase in excitation being inhibited when said input speed falls to the predetermined level, and means for de-energising at least one retaining relay in response to timing means initiated by an inhibiting signal such that said at least one relay is de-energised after a preset time unless an output speed signal indicates that a conveyor is beginning to accelerate, thus interrupting said retaining circuit and interrupting power supply to all couplings.

2. The control system of claim 1, in which said first and second switching means comprise first and second relays, respectively.

3. The control system of claim 1 or claim 2, in which the control means includes electrical power transforming means for converting the main electrical power supply to the operating supply level of the eddy current coupling devices.

4. The control system of claim 3, in which the power transforming means includes fault detecting means, the fault detecting means being connected between the secondary winding of the transformer and earth.

* * * * *